(12) United States Patent
Budinger et al.

(10) Patent No.: US 6,517,417 B2
(45) Date of Patent: Feb. 11, 2003

(54) POLISHING PAD WITH A TRANSPARENT PORTION

(75) Inventors: William D. Budinger, Key West, FL (US); John V. H. Roberts, Newark, DE (US)

(73) Assignee: Rodel Holdings, Inc., Wilmington, DE (US)

( * ) Notice: Subject to any disclaimer, the term of this patent is extended or adjusted under 35 U.S.C. 154(b) by 118 days.

(21) Appl. No.: 09/792,813

(22) Filed: Feb. 24, 2001

(65) Prior Publication Data

US 2001/0031610 A1 Oct. 18, 2001

Related U.S. Application Data

(60) Provisional application No. 60/185,197, filed on Feb. 25, 2000.

(51) Int. Cl.⁷ .................................................. B24B 49/12
(52) U.S. Cl. ............................. 451/41; 451/6; 451/287; 451/526
(58) Field of Search ................................ 451/6, 36, 37, 451/41, 285–289, 526; 438/5, 7, 8, 691–693; 156/345.11–345.15

(56) References Cited

U.S. PATENT DOCUMENTS

| | | | |
|---|---|---|---|
| 3,851,093 A | * | 11/1974 | Sunstein ..................... 348/742 |
| 5,018,811 A | | 5/1991 | Haavisto et al. |
| 5,106,394 A | * | 4/1992 | Bramson ....................... 106/3 |
| 5,136,818 A | * | 8/1992 | Bramson ................... 356/73.1 |
| 5,413,941 A | | 5/1995 | Koos et al. |
| 5,489,233 A | | 2/1996 | Cook et al. |
| 5,605,760 A | | 2/1997 | Roberts et al. |
| 5,609,511 A | | 3/1997 | Moriyama et al. |
| 5,893,796 A | | 4/1999 | Birang et al. |
| 5,899,792 A | | 5/1999 | Yagi |
| 6,074,287 A | | 6/2000 | Miyaji et al. |
| 6,171,181 B1 | | 1/2001 | Roberts et al. |
| 6,247,998 B1 | * | 6/2001 | Wiswesser et al. ........... 451/41 |

FOREIGN PATENT DOCUMENTS

| | | |
|---|---|---|
| EP | 0 747 167 A2 | 11/1996 |
| JP | 20002547860 A | 9/2000 |

* cited by examiner

*Primary Examiner*—Joseph J. Hail, III
*Assistant Examiner*—David B. Thomas
(74) *Attorney, Agent, or Firm*—Gerald K. Kita

(57) ABSTRACT

A transparent portion of a polishing pad in the solid phase has an index of refraction nearly matched to the index of refraction of a fluid polishing composition for chemical mechanical polishing, which minimizes scattering of an optical beam at an interface of the transparent portion and the polishing composition.

34 Claims, No Drawings

POLISHING PAD WITH A TRANSPARENT PORTION

CROSS REFERENCE TO RELATED APPLICATION

This application claims the benefit of provisional application 60/185,197 filed Feb. 25, 2000.

FIELD OF THE INVENTION

The invention relates to polishing a semiconductor substrate by a polishing pad having a transparent portion for transmission of an optical beam that is reflected from a surface of the semiconductor substrate, while the substrate is being polished.

DESCRIPTION OF RELATED ART

Polishing of a semiconductor substrate is further known as, polishing by chemical mechanical polishing or chemical mechanical planarization, CMP. Such polishing by CMP removes a layer of metal from an underlying barrier film of metal, and further removes the barrier film from an underlying dielectric layer on the semiconductor substrate, which leaves a smooth, planar polished surface on the dielectric layer serving as a substrate on which successive layers of material are fabricated, and further which leaves electrical circuit interconnects of precise dimensions, which interconnects are imbedded in trenches that are flush with the polished surface.

U.S. Pat. No. 6,074,287 discloses a known polishing pad for polishing a semiconductor substrate. Such polishing is performed by a polishing surface on the polishing pad, together with a fluid polishing composition at an interface of the polishing pad and the semiconductor substrate. The known polishing pad has at least a portion that is transparent to an optical beam, to transmit the optical beam for incidence of the optical beam on the surface of the semiconductor substrate. The optical beam transmits an optical signal that becomes incident on the surface of the semiconductor substrate, and that reflects from the surface. The optical signal becomes encoded with information pertaining to a change in the thickness of a layer as it is being removed by polishing. The reflected optical beam emanates to a detector that monitors the optical signal for such information. Further, the detector monitors the optical signal for end point detection, EPD, the occurrence of an end point, at which further polishing is stopped because the detector detects that substantial removal of the layer has been completed.

A problem arises because the polishing surface of the polishing pad varies from being flat and smooth. The polishing surface is manufactured with a topography of peaks and valleys, which includes, for example, a roughened surface texture, and a grooved surface. Such a topography enhances polishing abrasion, and distributes the fluid polishing composition evenly at the interface of the polishing pad and the semiconductor substrate. The peaks and valleys on the surface of the polishing pad change the orientation of the surface, such that the optical beam is incident on such a surface at different angles, depending on the orientation of such a surface at the point of incidence. Further, the surface of the polishing pad can become worn by polishing the semiconductor substrate, which changes the peaks and valleys, and which changes the orientation of the surface. The varying topography of the polishing surface scatters the incident optical beam. Scattering is undesirable for causing attenuation of the optical signal, and misdirection of the optical beam.

Another problem arises because the polishing pad and the fluid polishing composition meet along an interface thereof, which tends to scatter the optical beam due to the polishing pad and the fluid polishing composition having mismatched angles of refraction at the interface. Thus, a need exists for minimizing scattering of an optical beam at an interface with a transparent portion of a polishing pad.

SUMMARY OF THE INVENTION

The invention minimizes scattering of an optical beam at an interface with a surface of a transparent portion of a polishing pad. The invention includes a polishing pad for polishing a semiconductor substrate, the pad having at least a portion that is transparent to an optical beam, and the index of refraction of the transparent portion matched nearly to, differing by no more than a few percent of, that of a fluid polishing composition that is used during polishing of the semiconductor substrate, which minimizes scattering of the optical beam.

Further, the invention includes a method for adjusting the index of refraction of a fluid polishing composition for polishing a semiconductor substrate, comprising: adding a nonreactive salt in solution to adjust the index of refraction of the polishing composition matched nearly to, by no more than a few percent of, the index of refraction of a transparent portion of a polishing pad.

The invention further includes a fluid polishing composition for polishing a semiconductor substrate, the index of refraction of the polishing composition being adjusted to be matched nearly to, by differing by no more than a few percent of, that of a transparent portion of a polishing pad that is used during polishing of the semiconductor substrate, which minimizes scattering of an optical beam at an interface of the polishing composition and the transparent portion.

Embodiments of the invention will now be described by way of example with reference to the following detailed description.

DETAILED DESCRIPTION

A transparent portion of a polishing pad comprises, meaning that the transparent portion includes, and is not limited to, one or more than one of, a unitary transparent portion of a polishing pad disclosed in further detail by U.S. Pat. No. 6,171,181, a wholly transparent polishing pad disclosed in further detail by U.S. Pat. No. 5,605,760, and a transparent portion as a window comprising a plug of transparent material installed in an opening in the polishing pad disclosed in further detail by U.S. Pat. No. 5,605,760, and a transparent layer of a multiple layer polishing pad disclosed in further detail by U.S. Pat. No. 5,605,760, which patents are hereby incorporated by reference herein. The transparent portion is installed in a polishing layer of the polishing pad, and is flush with the polishing layer. A polishing surface of the polishing pad extends continuously over the transparent portion and the remainder of the polishing pad.

The polishing surface of the polishing pad varies from being flat and smooth. The polishing surface is manufactured with a topography of peaks and valleys including of one or more than one of various constructions, including, but not limited to, a porous surface, a roughened surface, and a surface with channels or grooves. In an embodiment, the surface of the transparent portion is provided with a topography having a surface texture or pattern as described in U.S. Pat. No. 5,489,233. Such a topography is crafted to achieve one or more than one of the following benefits, including, but not limited to; to enhance polishing abrasion, and to distribute the fluid polishing composition evenly at the interface of the polishing pad and the semiconductor substrate. The peaks and valleys on the surface of the polishing pad change the orientation of the surface, such that the optical beam is incident on such a surface at different angles, depending on the orientation of such a surface at the point of incidence. Further, the surface of the polishing pad can become worn by polishing of the semiconductor substrate, which changes the peaks and valleys, and which changes the orientation of the surface. Accordingly, the varying topography of the polishing surface causes scattering of the optical beam. Scattering is undesirable for causing attenuation of the optical signal being conveyed by the optical beam, and misdirection of the optical beam. Thus, it is desirable to minimize loss (attenuation) or change in light transmission (scattering) due to peaks and valleys of portion surface structure.

A back surface on a polishing pad is contacted by a platen of a polishing apparatus on which the polishing pad is mounted, either directly or through an intermediate base pad. Further details of a polishing apparatus are disclosed by European Patent Application number EP96304118 of EP0747167. The polishing surface of a polishing pad is applied with a force against a semiconductor substrate during polishing. A fluid polishing composition is applied at an interface of the polishing pad and the semiconductor substrate during polishing. The polishing composition is an aqueous solution that includes, but is not limited to, one or more than one of, a metal oxidizing agent and a metal ion complexing agent that chemically reacts with the metal being removed from the semiconductor substrate by polishing. According to one embodiment, the polishing composition further includes, abrasive particles in suspension in the aqueous solution. According to another embodiment, the polishing composition is abrasive free, and is used with a polishing pad that provides an abrasive. According to yet another embodiment, abrasive particles are released by the polishing pad during polishing for suspension in the aqueous solution.

Another problem arises because the polishing pad and the fluid polishing composition meet along an interface thereof, which tends to scatter the optical beam due to the polishing pad and the fluid polishing composition having mismatched indices of refraction at the interface. Thus, a need exists for minimizing scattering of an optical beam at an interface with a transparent portion of a polishing pad.

The invention includes a polishing pad with a transparent portion of solid phase that has an index of refraction that differs by no more than a few percent of a fluid polishing composition. The invention minimizes scattering of the optical beam at an interface with a surface of a transparent portion of a polishing pad. The invention comprises a polishing pad for polishing a semiconductor substrate, the pad having at least a portion that is transparent to an optical beam, and the index of refraction of the transparent portion varying by no more than a few percent of that of a fluid polishing composition that is used during polishing of the semiconductor substrate, the surface of the polishing pad having peaks and valleys, the valleys being adapted for being filled with the fluid polishing composition, and the peaks of the transparent portion combining with the polishing composition filling the valleys to form a composite polishing surface having a composite index of refraction that varies by no more than a few percent over the composite polishing surface, which minimizes scattering of the optical beam.

The polishing composition is an aqueous solution that includes, but is not limited to, one or more than one of, a metal oxidizing agent and a metal ion complexing agent that chemically reacts with the metal being removed from the semiconductor substrate by polishing. The oxidizing agent and the complexing agent are adjusted in concentration and vary in chemical composition to become chemically reactive with the composition of the metal being removed by polishing. Further, an oxidizing suppressant can be added and adjusted in concentration to suppress etching and/or oxidation of dielectric material of the semiconductor substrate. The index of refraction of each polishing composition is obtained, for example, by measurement according to known measurement procedures.

The index of refraction of the transparent portion of the polishing pad is selected to have an index of refraction that depends upon the measured index of refraction of the polishing composition. According to one measurement, the index of refraction, IR of the transparent portion is about the same as the index of refraction of the fluid polishing composition. About the same, as used herein, is intended to mean plus or minus 2.5%. Other measurements also apply. For example, the transparent portion of a polishing pad has an index of refraction that is within, or that differs by, no more than, 0.1% to 2.5% of the index of refraction of the fluid polishing composition with which the pad is to be used. In an embodiment, the transparent portion has an index of refraction ($IR_{portion}$) that is within, or that differs by no more than, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4 to 2.5% of the index of refraction of the polishing composition ($IR_{polishing\ composition}$). More preferably, the $IR_{portion}$ is within, or differs by no more than, 0.1 to 1.5% of the $IR_{polishing\ composition}$. Even more preferably, the $IR_{portion}$ is within, or differs by no more than, 0.1 to 1.0% of the $IR_{polishing\ composition}$. Still more preferably, the $IR_{portion}$ is within, or differs by no more than, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19 to 0.20% of the $IR_{polishing\ composition}$. Further preferably, the $IR_{portion}$ is within, or that differs by no more than, 0.01 to 0.10% of the $IR_{polishing\ composition}$.

When the fluid polishing composition is comprised mostly of water having an IR of 1.33, and having little else is in solution that would change the IR to a different value, the present invention provides a polishing pad with a transparent portion having an IR that differs by no more than a few percent from that of the polishing composition, for example, an IR of from about 1.30, 1.31, 1.32, 1.33, 1.34, 1.35, to about 1.36. More preferably, the $IR_{portion}$ of the present invention is from about 1.31 to about 1.35. Even more preferably, the $IR_{portion}$ of the present invention is from about 1.32 to about 1.34. Still more preferably, the $IR_{portion}$ of the present invention is 1.32, 1.33, or 1.34. Further preferably, the $IR_{portion}$ of the present invention is 1.33.

A polishing pad having the desired IR in the solid phase is a preferred material, and is found and identified in, Polymer Handbook, second edition, Brandrup and Immergut editors, Interscience Publishers, John Wiley and Sons, 1975, pages III-241 to III-242. The refractive index $r_{AB}$ of a random copolymer of monomers A and B may be obtained. If the density ρ and the refractivity r of each is known. By interpolation with respect to the weight contents c, then: $r_{AB} = C_A r_A + (1-C_A) r_B$ correlates the refractive index r to the density.

where the specific refractivity r=R/M and R is the molar refractivity and M is the molecular weight.

Examples of materials that comprise the transparent portion, include, but are not limited to, a transparent fluoroacrylate, poly(tetrafluoroethylene-cohexafluoropropylene), poly(pentadecafluorooctyl acrylate), poly(tetrafluoro-3(heptafluoropropoxy)(propyl)(acrylate), poly(tetrafluoro-3(pentafluoroethoxy)(propyl)(acrylate), poly(tetrafluoroethylene), poly(undecafluorohexyl acrylate), poly(nonafluoropentyl acrylate), and poly(tetrafluoro-3-(trifluoromethoxy)(propyl)(acrylate).

The transparent portion is formed, for example, by any known polymeric material that is transparent in the solid phase, and that is formulated in a liquid phase to provide the above-described IR in the solid phase. The transparent portion is formed, for example, by a mixture of known polymeric materials that are miscible in the solid phase to provide the above-described IR in the solid phase. Examples of materials include, but are not limited to, polyurethanes, acrylics, polycarbonates, nylons, polyesters, polyvinyl chlorides, polyvinylidene fluorides, polyether sulfones, polystyrenes, polyethylenes and polytetrafluoroethylenes. The transparent portion is made, for example, by casting or extruding the polymer, and by sintering or otherwise curing the polymer to the desired size and thickness. Further details are described in U.S. Pat. No. Patent 5,605,760 and U.S. Pat. No. Patent 6,171,181, hereby incorporated by reference herein.

One embodiment of the polishing pad comprises a polishing layer and a backing layer. The polishing layer is preferably a polyurethane layer, such as IC1000 material made by Rodel, Inc., of Newark, Del. The backing layer is preferably a less flexible layer, such as Suba IV material made by Rodel, Inc., of Newark, Del. The polishing layer has a top polishing face and a bottom face. The backing layer has a top face and a bottom face. The polishing layer and the backing layer are generally adhered together by an adhesive, usually a pressure sensitive adhesive.

In an embodiment in which the polishing layer and the backing layer are substantially opaque to wavelengths of 190 to 3500 nanometers, such layers are provided with overlying openings. A transparent portion can be disposed in the opening in either the polishing layer solely, or the opening in both the polishing and backing layers. When the portion is disposed only in the opening in the polishing layer, then it is preferred that the opening in the backing layer is dimensioned smaller than the opening of the polishing layer to provide a seat or frame for the portion.

The polishing pad preferably comprises a polymeric matrix formed from urethanes, melamines, polyesters, polysulfones, polyvinyl acetates, fluorinated hydrocarbons, and the like, and mixtures, copolymers and grafts thereof. A polymer having sufficient toughness and rigidity to resist abrasive wear during polishing operations is desired. For example, the polymeric matrix comprises a urethane polymer. The urethane polymer is formed from a polyether-based liquid urethane, such as the Adiprene™ line of products that are commercially available from Uniroyal Chemical Co., Inc. of Middlebury, Conn. The exemplary liquid urethane contains about 9 to about 9.3% by weight free isocyanate. Other embodiments include other isocyanate bearing products and prepolymers.

An exemplary liquid urethane is one which reacts with a polyfunctional amine, diamine, triamine or polyfunctional hydroxyl compound or mixed functionality compounds such as hydroxyl/amines dwelling in urethane/urea crosslinked networks to permit the formation of urea links and a cured/crosslinked polymer network. An exemplary the liquid urethane is reacted with 4,4' methylene-bis(2-chloroaniline) ("MOCA"), which is commercially available as the product CURENE® 442, from Anderson Development Co. of Adrian, Mich.

Polishing materials are formed in the shape of a rectangular sheet, or formed in a molding apparatus, and the resulting article is cut, sliced, or otherwise machined to any thickness or shape as desired. Although the transparent portion has been described with reference to a two layer stacked polishing pad, it can be incorporated in a single layer-polishing pad comprising a polishing layer without a backing layer, or incorporated in a stacked polishing pad comprising more than two layers.

Known polishing pads include those that are opaque to wavelengths of 190 to 3500 nanometers, and those that have indices of refraction exceeding about 1.24 to about 1.5. Further these known polishing pads are transparent to newly developed emitting devices that emanate beams of optical wavelengths outside of such a spectrum of 190 to 3500 nanometers. Accordingly, the invention further includes a fluid polishing composition for polishing a semiconductor substrate, the index of refraction of the polishing composition being adjusted to vary by no more than a few percent of that of a transparent portion of a known polishing pad. Such an adjustment enables a transparent portion of a polishing pad to have an index of refraction that is within, or that differs by no more than, 0.1% to 2.5% of the adjusted index of refraction of the fluid polishing composition with which the pad is to be used. In an embodiment, the transparent portion has an index of refraction ($IR_{portion}$) is within, or that differs by no more than, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4 to 2.5% of the adjusted index of refraction of the polishing composition ($IR_{polishing\ composition}$).

The IR of the polishing composition is adjusted by adding, in solution, a nonreactive salt, for example, $CsNO_3$ and/or potassium iodate, which are free of chemical reaction with other constituents of the polishing composition, and which are free of chemical reaction with the materials of the semiconductor substrate. In addition, increases in potassium iodate concentration causes disproportionate differences in the adjusted index of refraction, which enables adjustment of the IR over a wide range.

Although preferred embodiments have been described, other embodiments and modifications are intended to be covered by the spirit and scope of the appended claims.

What is claimed is:

1. A polishing pad for chemical-mechanical polishing, comprising: a polishing surface on the polishing pad, and a transparent portion disposed in an opening in the polishing surface, wherein the transparent portion comprises a mixture of polymeric materials that are miscible in their solid phases, and the polymeric materials provide the mixture with a selected composite index of refraction nearly matched to an index of refraction of a polishing composition for chemical-mechanical polishing.

2. The polishing pad according to claim 1, wherein the transparent portion has an index of refraction that differs by 0.1 to 2.5% of the index of refraction of the polishing composition for chemical-mechanical polishing.

3. The polishing pad according to claim 1, wherein the transparent portion has an index of refraction that differs by 0.1 to 1.5% of the index of refraction of the polishing composition for chemical-mechanical polishing.

4. The polishing pad according to claim 1, wherein the transparent portion has an index of refraction that differs by 0.1 to 1% of the index of refraction of the polishing composition for chemical-mechanical polishing.

5. The polishing pad according to claim 1, wherein the transparent portion has an index of refraction that differs by 0.01 to 1% of the index of refraction of the polishing composition for chemical-mechanical polishing.

6. The polishing pad according to claim 1, wherein the transparent portion has an index of refraction of from 1.30 to 1.36.

7. The polishing pad according to claim 1, wherein the transparent portion has an index of refraction of from 1.31 to 1.35.

8. The polishing pad according to claim 1, wherein the transparent portion has an index of refraction of from 1.32 to 1.34.

9. The polishing pad according to claim 1, wherein the transparent portion has an index of refraction 1.32.

10. The polishing pad according to claim 1, wherein the transparent portion has an index of refraction 1.33.

11. The polishing pad according to claim 1, wherein the transparent portion has an index of refraction 1.34.

12. The polishing pad according to claim 1, further comprising: a backing layer.

13. The polishing pad according to claim 1, wherein the polishing surface, comprises: a polyurethane.

14. The polishing pad according to claim 1, wherein the transparent portion comprises a material selected from poly(tetrafluoroethylene-co-hexafluoropropylene), poly(pentadecafluorooctyl acrylate), poly(tetrafluoro-3-(heptafluoropropoxy)propyl)acrylate), poly(tetrafluoro-3-(pentafluoroethoxy)propyl)acrylate), poly(tetrafluoroethylene), poly(undecafluorohexyl acrylate), poly(nonafluoropentyl acrylate), and poly(tetrafluoro-3-(trifluoromethoxy)propyl)acrylate) and other materials of similar refractive index.

15. A polishing pad for polishing a surface of a semiconductor substrate at an interface of the polishing pad and the semiconductor substrate, comprising:

a transparent portion of the polishing pad for transmitting an optical beam for incidence on the surface of the semiconductor substrate, a polishing surface on the transparent portion having a topography with peaks and valleys, the valleys of the polishing surface on the transparent portion adapted for being filled with a fluid polishing composition, the index of refraction of the transparent portion differing by no more than 2.5% of the index of refraction of the polishing composition, and the peaks of the polishing surface on the transparent portion combining with the polishing composition filling the valleys to form a composite surface at said interface, said composite surface having a composite index of refraction that differs by no more than 2.5% over the composite surface, which minimizes scattering of the optical beam.

16. The polishing pad according to claim 15 wherein the transparent portion comprises a window in a polishing layer of the polishing pad.

17. The polishing pad according to claim 15 wherein the transparent portion comprises a transparent layer of the polishing pad.

18. The polishing pad according to claim 15 wherein the transparent portion is unitary with a polishing layer of the polishing pad.

19. A polishing pad and a polishing composition for polishing a surface of a semiconductor substrate, comprising:

a transparent portion of the polishing pad for transmitting an optical beam for incidence on the surface of the semiconductor substrate, the transparent portion having a topography with peaks and valleys, the index of refraction of the transparent portion differing by no more than 2.5% of the index of refraction of the polishing composition, and the peaks of the transparent portion combining with the polishing composition filling the valleys to form a composite polishing surface having a composite index of refraction that varies by no more than 2.5% over the composite polishing surface, which minimizes scattering of the optical beam.

20. The polishing pad according to claim 19 wherein the transparent portion comprises a window in a polishing layer of the polishing pad.

21. The polishing pad according to claim 19 wherein the transparent portion comprises a transparent layer of the polishing pad.

22. The polishing pad according to claim 19 wherein the transparent portion is unitary with a polishing layer of the polishing pad.

23. The polishing pad according to claim 19 wherein the polishing composition is an aqueous solution of a metal oxidizing agent and a metal ion complexing agent.

24. The polishing pad according to claim 23 wherein the transparent portion comprises a window in a polishing layer of the polishing pad.

25. The polishing pad according to claim 23 wherein the transparent portion comprises a transparent layer of the polishing pad.

26. The polishing pad according to claim 23 wherein the transparent portion is unitary with a polishing layer of the polishing pad.

27. A method of making a polishing pad, comprising the steps of:

obtaining the index of refraction of a fluid polishing composition, fabricating a transparent portion of a polishing pad with a material that has an index of refraction differing by no more than 2.5% of the index of refraction of the polishing composition, and providing the transparent portion with a polishing surface having peaks and valleys, wherein the valleys are adapted to be filled with the polishing composition, and the peaks combine with the polishing composition filling the valleys to provide a composite polishing surface having a composite index of refraction that differs by no more than 2.5% of the index of refraction of the polishing composition.

28. The method as recited in claim 27, wherein the step of obtaining the index of refraction of the fluid polishing composition further includes the step of, obtaining the index of refraction of an aqueous solution of a metal oxidizing agent and a metal ion complexing agent.

29. A method for adjusting the index of refraction of a fluid polishing composition for polishing a semiconductor substrate, comprising: adding a nonreactive salt in solution to adjust the index of refraction of the polishing composition to nearly match the index of refraction of a transparent portion of a polishing pad.

30. The method for adjusting the index of refraction of a fluid polishing composition, as recited in claim 29, wherein the step of adding a nonreactive salt, further includes the step of adding $CsNO_3$.

31. The method for adjusting the index of refraction of a fluid polishing composition, as recited in claim 29, wherein the step of adding a nonreactive salt, further includes the step of adding potassium iodate.

32. A fluid polishing composition for polishing a semiconductor substrate, comprising: a nonreactive salt in solution to adjust the index of refraction of the polishing composition to nearly match that of a transparent portion of a polishing pad that is used during polishing of the semiconductor substrate, which minimizes scattering of an optical beam at an interface of the polishing composition and the transparent portion.

33. The fluid polishing composition as recited in claim 32 wherein, the nonreactive salt includes $CsNO_3$.

34. The fluid polishing composition as recited in claim 32 wherein, the nonreactive salt includes potassium iodate.

* * * * *